United States Patent Office 3,019,216
Patented Jan. 30, 1962

3,019,216
POLYMERIZATION OF OLEFINS INTO POLYMERS OF HIGH MELTING POINT
Louis Schmerling, Riverside, Ill., assignor, by mesne assignments, to Universal Oil Products Company, Des Plaines, Ill., a corporation of Delaware
No Drawing. Filed Dec. 24, 1956, Ser. No. 630,096
9 Claims. (Cl. 260—94.9)

This invention relates to a process for polymerizing olefinic hydrocarbons, particularly ethylene, to form high molecular weight polymers, including a class of polymers referred to herein as "hard polymers" which are especially useful in many of the fabricating arts, particularly for the manufacture of molded articles such as containers, tubes, pipes, pliable structures, etc. and for the production of articles generally in which resins and plastics are useful starting materials. More specifically, this invention concerns a process for manufacturing high molecular weight polymerized olefinic hydrocarbons in the presence of a particular combination of catalyst components comprising a titanium tetrahalide and aluminum metal and in the presence, further, of a diluent for the reaction mixture and for the polymeric product, said diluent being selected from the halogen-substituted aromatic hydrocarbons.

It has been found that a very desirable class of polymeric olefins, referred to herein as "hard polymers" and which exist in the form of solids having relatively high melting points may be produced by a polymerization process utilizing selected reaction conditions and a particular class of catalysts, hereinafter further characterized, the polymers having molecular weights substantially in excess of 10,000 and softening points substantially above the boiling point of water, for example, in the region of 115° to about 140° C., some fractions of the product melting at even higher temperatures. The improvement of the above process to which this process relates involves carrying out the polymerization with aforementioned catalyst utilizing a liquid diluent or solvent of the reactants, the catalyst and the polymeric product formed by virtue of the polymerization reaction.

The indicated hard polymer class of olefin polymerization product is a particularly desirable product for use of the material in applications in which plastics and resins are frequently utilized because of the desirable physical and structural stability of the product at temperatures above the boiling point of water. These physical properties of the product make it especially adapted to its use as a molding material for the fabrication of articles which are subject during their use to relatively high temperatures, as for example, articles which are sterilized prior to use at temperatures in excess of 100° C. but which must also possess sufficient structural stability to withstand plastic deformation at such temperatures or be capable of returning to their original shape after cooling. It is recognized that processes are now in use for polymerizing olefinic hydrocarbons which result in polymers having structural stability at relatively high temperatures, but in many cases such polymers undergo a permanent set when heated to temperatures above the boiling point of water or becomes sufficiently soft at temperatures in this region that the polymer tends to flow and to undergo permanent distortion.

Processes are also known wherein the olefinic monomer is polymerized in the presence of an aromatic hydrocarbon solvent, providing significant advantages in operating the process and in enhancing the yield therefrom; such diluents, however, are unavailable in the present process utilizing a titanium tetrahalide catalyst component because of the formation of a substantial yield of the aromatic hydrocarbon alkylates of the olefin as a side reaction product when such aromatic hydrocarbons are present in the reaction mixture with the catalyst which is thus also active as an alkylation catalyst. These alkylates although possible of use for other purposes, are nevertheless considered as undesirable end products of the reaction. The resulting side reactions are therefore considered as undesirable deviations from the polymerization reaction because of the consumption not only of olefin monomer which would otherwise be available for the production of the desired polymeric product, but, in addition, the consumption of aromatic diluent to form aromatic alkylate which cannot be recycled as diluent in the process. In accordance with the process of this invention, on the other hand, the olefin monomer polymerized to produce the desired hard polymer in substantially its entirety without undesired alkylate formation, when the diluent or solvent supplied to the reaction zone is a halogen-substituted aromatic hydrocarbon selected from the nuclearly halogen-substituted aromatic and alkyl aromatic hydrocarbons of both the mono- and bicyclic series. Thus, no significant proportion of the olefinic monomer feed stock is dissipated to produce alkylates of the halogen-substituted aromatic hydrocarbon diluent as in the case of the production of alkylates when an aromatic hydrocarbon is employed as diluent. Furthermore, the diluent or solvent may be completely recovered from the reaction product for recycling in the process without the necessity of separating undesired side reaction products therefrom.

In one of its embodiments the present invention relates to a process for polymerizing an olefinic hydrocarbon containing from 2 to 5 carbon atoms which comprises contacting said hydrocarbon at a temperature of from about 20° to about 300° C. and at a superatmospheric pressure with a catalyst comprising a mixture of a metal containing aluminum and a halide of titanium and in the presence of a halogen-substituted aromatic hydrocarbon.

A more specific embodiment of this invention relates to the process of the above embodiment in which the catalyst comprises a mixture of a metal containing aluminum and titanium tetrachloride and said diluent is p-chlorotoluene.

The products of this inventon are essentially high molecular weight hydrocarbons formed by polymerizing or condensing olefins of lower molecular weight in a process referred to as a polymerization reaction, effected under such conditions and for a period of time sufficient to form mono-olefins having molecular weight substantially in excess of about 10,000 generally in the region above about 30,000, depending upon the olefin monomer utilized as starting material. The resulting polymers contain one olefinic double bond per molecule and in view of their high molecular weight, they may be considered essentially paraffinic in nature, the single olefinic bond in the large molecule having little effect on the chemical or physical properties of the resulting polymer and especially upon its sensitivity to chemical attack. The charging stock to the present polymerization process and the active ingredient in a mixed hydrocarbon feed (when a mixture of olefins and other types of hydrocarbons is utilized) is an olefinic hydrocarbon containing up to about 8 carbon atoms per molecule, although under certain reaction conditions, higher molecular weight olefins may also be utilized or included in the charging stock. Olefins of low molecular weight, particularly ethylene, are the preferred olefinic charge stock because of the desirable physical properties of the polymeric product produced therefrom. Furthermore, 1-alkenes such as 1-butene and 1-pentene are preferred over their isomers in which the olefinic bond does not occur on the terminal carbon atom, such as 2-butene and 2-pentene. The desired monomer may be charged either individually or in admixture with other olefins (for example, a mixture of $C_2$-$C_4$ olefins separated from the light gaseous product of a thermal cracking process) or with cyclic olefins of higher molecular weight. Cycloalkenes, such as cyclohexene, may also be used individually as charging stock. The alkene may also be present in a mixture of hydrocarbons, not necessarily consisting entirely of olefin monomers, such as a mixture of low molecular weight olefins and paraffins, aromatics and/or naphthenes. A typical example of such a mixture is the aforementioned light gaseous fraction of the product of a petroleum cracking reaction comprising $C_2$-$C_5$ olefins, as well as normal and isoparaffins having a corresponding number of carbon atoms per molecule. In other instances a low molecular weight olefin, such as ethylene, may be mixed with a normally liquid hydrocarbon, such as cyclohexane, isopentane, or heptane to provide the charging stock in which the saturated hydrocarbon serves as a diluent of the olefin monomer component of the fed stock. The presence of such diluents in the reaction mixture, however, are generally not preferrred in view of the presence of the halogen-substituted aromatic hydrocarbon diluent herein specified in the reaction mixture.

In most processes known to the prior art for catalytically polymerizing olefin monomers the catalyst is an acidic-type material which introduces a reagent capable of forming a free-radical chain initiator from the olefin monomer charged. Although a diluent is generally desired in such catalyzed polymerization reactions, including diluents of the aromatic hydrocarbon type such as benzene, toluene, xylene, etc., the catalyst also catalyzes the condensation of the olefin monomer with such aromatic diluents, resulting in the formation of aromatic hydrocarbon alkylates of the olefin monomer reactant, as heretofore indicated. It has been observed that aromatic hydrocarbons constitute a selected class of materials for use as diluents of olefin polymerization processes because of the ability of the aromatic hydrocarbon to dissolve the olefinic polymer formed during the process and thus maintain the active surface of the catalyst free for contact with additional olefin monomer, thereby promoting the completion of the the polymerization reaction and increasing the molecular weight and yield of desired polymer. Such undesired side reactions involving aromatic hydrocarbon diluents are also obtained in the presence of the catalyst herein specified for effecting the polymerization of mono-olefins to the desired "hard" polymers. It has now been found that the desired type of polymerization reaction may be obtained (that is, with the resulting production of "hard" polymers), without the attending disadvantages of side reactions which occur during the polymerization reaction in the presence of other diluents such as aromatic hydrocarbons, by utilizing a halogenated aromatic hydrocarbon as a diluent of the reaction mixture, the latter class of diluents not only resisting the above-indicated side reactions, but also imparting to the process all of the advantages of utilizing an aromatic diluent for the reaction, including the ability of the diluent to maintain the aluminum surface free of polymer and thus free to react with the olefin monomer charged into the reaction mixture.

The halogenated aromatic hydrocarbons herein contemplated for use as diluent-solvents for the present polymerization process may be selected from the mono- or bicyclic species and from the mono- or poly-halogen-substituted derivatives, including the fluorine, chlorine, bromine, or iodine-substituted derivatives, although the so-called middle halogens, that is, chlorine and bromine, are the preferred halide substituents because they are readily available and because of the desirable physical and chemical properties which these halogen-substituted derivatives possess. Of the nuclearly halogen-substituted aromatic hydrocarbons of the monocyclic series, particularly preferred individual members of the series are, for example, monochlorobenzene, monobromobenzene, ortho-, meta-, and para-dichlorobenzene, ortho-, meta-, para-dibromobenzene, ortho-, meta-, para-chlorotoluene, 2,6-dichlorotoluene, 2,3-dichlorotoluene, 2,4-dichlorotoluene, 3,4-dichlorotoluene, 3,5-dichlorotoluene, the corresponding bromo-substituted analogs, the mono- and dichloroxylene isomers, other chloro- and bromoalkylbenzenes, such as mono- or dichloroethylbenzene, mono- or dichloro-n-propylbenzene, mono- or dichlorocumene, etc. as well as the mixed dihalogen-substituted benzenes and alkylbenzenes, such as 2-chloro-2-bromotoluene etc. Of the bicyclic aromatic halides, the nuclearly substituted naphthalene halides may be represented, for example, by such compounds as alpha- or beta-chloronaphthalene, or one of the nuclearly halogen-substituted methylnaphthalenes. The phenyl and tolyl halides are particularly preferred herein, especially para-chlorotoluene which may be maintained in liquid phase at the temperature and pressure at which the olefin polymerization is effected and which effectively dissolves not only the initial charging stock, the catalyst components and liquid hydrocarbon polymer product, but is also an effective solvent for the polymers of intermediate and somewhat higher molecular weight formed during the course of the reaction. In view of its solubilizing effect on the reacting components and the products of the reaction, the surface of the aluminum continuously exposed to the olefin monomer and titanium present in the reaction mixture, thus making ithe catalyst available to the olefin charge at all times during the course of the reaction.

The halogenated aromatic hydrocarbon diluent is maintained within the reaction mixture in an amount sufficient to solubilize the above-indicated constituents present in the reaction zone, including the olefin polymer, generally in an amount representing from about 0.1 to about 1,000 parts by weight of the olefin monomer charged to the reaction zone, a particularly preferred range being from about 0.5 to about 5.0 parts by weight of the olefin monomer charged. The solvent-diluent, because of its solubilizing action and its capacity to resist side reactions in the polymerization zone may be recovered in its unaltered form following the completion of the polymerization reaction and recycled directly to the latter zone after separation from the reaction mixture.

Diluents of the present type, comprising the halogenated aromatic hydrocarbons, are particularly adapted for use in the polymerization of olefins since, unlike aromatic hydrocarbons containing a replaceable hydrogen atom, they do not undergo such a side reaction as alkylation with the olefin charging stock. Thus, when toluene is used as diluent for the polymerization of ethylene in the presence of titanium tetrachloride and aluminum, it is converted to a mixture of mono-, di-, tri-, and tetraethylbenzenes.

The olefinic charge stock in the present process is polymerized to form the so-called "hard" polymers by contacting the charge stock in the form of a pure olefin or as a mixture of an olefine with a paraffin with the catalyst in the presence of the chlorinated aromatic hydrocarbon diluent herein provided. Although the polymerization reaction may be effected at atmospheric pressure, it is generally preferred to carry out the process at a superatmospheric pressure, up to about 3,000 p.s.i. or even at higher pressures (preferably from about 100 to about 1,500 p.s.i.), the preferred pressure in each instance being dependent upon the type of product desired and also upon the composition of the olefinic charge stock. Suitable reaction temperatures for the polymerization reaction are within the range of from about room temperature (that is, at about 25° C.) to temperatures in the region of about 300° C., preferably from about 50° to about 250° C. As in the case of the pressure variable, the reaction temperature required for effecting the polymerization is dependent upon the character of the olefinic feed stock and also upon the ultimate type of product desired.

It is usually desirable to carry out the polymerization reaction in the substantial absence of air or oxygen, although hydrogen may be present in the reaction zone without seriously affecting the course of the reaction or the yield of olefin polymer. When hydrogen is utilized in the feed stock, however, the product formed is not necessarily the same as the product obtained by polymerization of the olefin in the absence of hydrogen, the former product generally being of lower melting point and of lesser reactivity with chemical reagents, such ar air, than the product formed in the absence of hydrogen.

The use of the present halogenated aromatic hydrocarbon as solvent-diluent in the present process provides a common solvent for each of the various components present in the reaction mixture, including the catalyst, the olefin monomer and at least a portion of the polymer formed during the polymerization reaction. Thus, it becomes possible to maintain the olefin monomer in contact with the catalytic components and to maintain the olefin monomer in intimate contact with the components of the catalyst, thereby ensuring co-action between the catalytic components (when the catalyst is a multiple component mixture) and the olefin monomer, independent of the effect of polymer in the reaction mixture.

The present process, although particularly adapted to batch-type methods of operation, may also be effected by means of essentially continuous methods, the presence of the solvent in the reaction mixture making such continuous methods of polymerization not only feasible but peculiar to such use of a liquid, halogenated aromatic hydrocarbon diluent. Thus, in a typical continuous method of polymerization, the aluminum may be distributed in a reaction zone in granular form or in layers, or deposited upon a suitable packing material, such as fire brick, quartz chips, etc., or the aluminum may be in the form of a tube (suitably reinforced by an outer tube of steel) comprising the reaction zone, and the olefin and the titanium chloride, supplied to the reaction zone in the form of a solution in the halogenated aromatic hydrocarbon, is continuously passed over and through the bed of aluminum maintained at the desired reaction pressure and temperature conditions, the polymers formed during the resulting polymerization reaction being continuously removed with the diluent from the opposite end of the polymerization reactor as it is formed and as additional olefin feed is introduced into the inlet end of the reactor. By such means a truly continuous process may be provided, since the desired polymer product may be continuously separated from the effluent diluent stream, for example, by vaporization of the diluent from the polymer. Alternatively, the solution may be cooled to deposit the polymer which is then filtered from the diluent and the latter is removed from lower molecular weight polymer (grease and wax) by distillation and recycled. In a typical batch-type operation, the diluent, catalyst and olefin are charged into a pressure autoclave to the desired pressure, and the autoclave thereafter heated to the desired reaction temperature as the reaction mixture is agitated, for example, by stirring. The polymer is thereafter recovered from the reactor after discontinuing the addition of monomer and stopping the reaction.

The polymeric products of this invention are generally mixtures of polymers of various molecular weights usually averaging above about 10,000 and mostly above about 50,000, a major proportion of the polymer having molecular weights within the range of from about 100,000 to about 500,000. Depending upon the reaction temperature and pressure and the character of the olefin charge stock, the molecular weight may even be as high as several million. It is generally found that the highest molecular weight components of the polymeric product are relatively insoluble in the present diluent, while the lower molecular weight fractions are relatively soluble therein, such that the effluent stream of diluent from the reaction zone contains suspended particles of high molecular weight polymers and dissolved fractions of the lower molecular weight components of the polymer. These may be separated, for example, by filtering the effluent product stream to recover the suspended high molecular weight solids, and thereafter vaporizing the diluent from the lower molecular weight fractions dissolved therein. The product may be further fractionated by selective solvent fractionation with other solvents having selective solubilizing properties on individual fractions constituting the product. Thus, a relatively low molecular weight fraction may sometimes be separated from the mixed polymer product by extracting the latter at a temperature below about 50° C. to 80° C. with an aromatic hydrocarbon such as benzene, toluene, xylene, etc., leaving a fraction of higher molecular weight material having different properties than the fraction thus extracted. Intermediate molecular weight fractions may be dissolved in the solvent while it is hot and when such solution is cooled, these polymers precipitate from the solution, while the lowest molecular weight fractions (which exist in the form of liquids, greases, and waxes) remain dissolved in the solvent. Suitable solvents of the latter type capable of effecting such fractional separation are the liquid aliphatic hydrocarbons. Solvents which may be utilized to separate the intermediate molecular weight fractions include the alkyl halides, dihalides and polyhalides, for example, ethyl chloride, ethyl bromide, ethylene dichloride, ethylene dibromide, trichloropropane, chloroform, carbon tetrachloride, perfluorobutane, etc. A step-wise fractionation procedure may be employed in order to segregate polymeric fractions corresponding to certain ranges of molecular weights. Thus, the highest molecular weight fractions are insoluble in the present halogenated aromatic hydrocarbon diluent and may be separated from the reaction effluent by filtering the latter. The intermediate and lower molecular weight polymers contained in the diluent may be recovered by evaporating the diluent and removing the lower molecular weight components therefrom by diluting the mixture with an aliphatic paraffin which maintains in solution the lower polymers but which precipitates the intermediate polymers. The latter intermediates recovered by filtration may be further separated by diluting with an aromatic hydrocarbon solvent, as indicated above.

This invention is further illustrated with respect to several of its specific embodiments in the following examples which are presented for illustrative purposes only and not for the purposes of limiting the scope of the invention necessarily in accordance therewith.

*Example I*

The results obtainable by polymerizing ethylene in the presence of a catalyst normally capable of producing the so-called hard polymer in the absence of any diluent are shown in the following run: A mixture of 2 grams of titanium tetrachloride and 3 grams of aluminum foil were placed in the glass liner of a rotating pressure autoclave of 850 cc. capacity. The autoclave and liner were flushed with nitrogen and ethylene gas to remove oxygen from the system and thereafter ethylene was charged into the autoclave to a pressure of 56 atmospheres. The autoclave was then sealed and slowly heated to a temperature of 244° C. The maximum pressure developed during the course of the reaction was 110 atmospheres, the final pressure at room temperature (after heating at 244° C. for 5 hours) was 41 atmospheres. The contents of the autoclave were removed, the product consisting of 2 grams of a dark amber liquid and less than 40 grams of solid polymer mixed therewith, the liquid polymer being recovered from the solid polymer by extraction with liquid n-pentane and evaporating the pentane extract from the liquid polymer residue. The net consumption of ethylene in the reaction was estimated to be less than 10% of the quantity charged into the autoclave. Distillation of the liquid product indicated that the liquid polymers were low molecular weight olefins having a boiling point of less than 200° C.

In a reaction similar to the above, except that 206 grams of toluene was charged with the 2 grams of titanium tetrachloride and 2 grams of aluminum foil into the glass liner of the autoclave, the maximum temperature attained during the course of the polymerization was 244° C., the maximum pressure was 140 atmospheres and the final pressure at room temperature was 10 atmospheres. In the presence of the toluene diluent, it is estimated that approximately 80% of the ethylene charged underwent reaction, the product consisting of 297 grams of dark amber liquid and less than 10 grams of the solid polymer. Distillation of the liquid product indicated that at least 65% of the toluene charged underwent alkylation, the alkylate consisting of 27% mono-, 27% di-, 4% tri-, and 7% tetraethyltoluenes, together with a small amount of higher boiling residue.

In each of several, separate experiments similar to the above, except that benzene and ethylbenzene were utilized as solvent-diluents, substantially similar results were obtained in that alkylates of the aromatic diluent comprised a major proportion of the olefin reaction product, even in reactions carried out at lower temperatures, with only minor amounts of solid polymer product.

In a reaction carried under otherwise identical conditions as the preceding experiments, except that p-chlorotoluene was substituted for toluene as diluent-solvent, a larger proportion of the ethylene polymerized to form the desired so-called "hard" polymer as a major portion of the reaction product. Thus, 200 grams of p-chlorotoluene, 2 grams of titanium tetrachloride, and 3 grams of aluminum foil in a glass liner were charged into a rotating pressure autoclave of 850 cc. capacity. The autoclave was thereafter flushed with nitrogen and ethylene gas to remove air, followed by charging ethylene into the autoclave to a pressure of 56 atmospheres. The autoclave and its contents were thereafter slowly heated at a temperature of 240° C. for a period of 5 hours, followed by cooling to room temperature. At the latter temperature, the internal autoclave pressure was 1 atmosphere. The product consisted of approximately 60 grams of amber granules of solid polyethylene wet with chlorotoluene. The latter diluent was removed by heating the product under reduced pressure and subsequent distillation of the recovered oil indicated that it boiled substantially completely within the range of 159–161° C., little if any of the material corresponding to ethylated parachlorotoluene.

*Example II*

The process is also operable under other reaction conditions and in the presence of other halogen-substituted aromatic hydrocarbon diluents, as indicated in the following runs: A solution of 2 grams of titanium tetrachloride and 50 grams of p-chlorotoluene was charged into a pressure, rotating autoclave containing 1.5 grams of aluminum foil, the autoclave flushed with nitrogen ethylene and charged to a pressure of 40 atmospheres with substantially pure ethylene. Thereafter, the autoclave was slowly heated to a temperature of from about 90 to 125° C., the reaction producing a maximum pressure was 60 atmospheres. After cooling to room temperature, the final pressure was 1 atmosphere. The product is principally solid polymeric material (45 grams), wet with chlorotoluene which was identified by distillation thereof at a temperature of 159–161° C.

In other reactions carried out at substantially the same conditions, chlorobenzene was utilized as the diluent-solvent and at a reaction temperature of 140–150° C., the product also consisting of solid polyethylene. Similar results were also obtained with 1-chloronaphthalene and with p-dichlorobenzene. The latter, which is a crystaline solid melting at 53–54° C., was separated from the polyethylene by filtration at 60° C. Alternatively, the dichlorobenzene may be extracted from the polymer by a hydrocarbon such as benzene at a temperature below about 50° C.

I claim as my invention:

1. A process for producing a solid olefin polymer which comprises polymerizing a mono-olefinic hydrocarbon of from 2 to about 8 carbon atoms per molecule at a temperature of from about 20° C. to about 300° C. and a pressure of from atmospheric to about 3000 pounds per square inch in contact with catalytic amounts of titanium tetrachloride and aluminum metal and a diluent, in an amount of from about 0.1 to about 1000 parts by weight of said hydrocarbon, said diluent being a nuclearly halogen-substituted aromatic hydrocarbon, the aromatic hydrocarbon being selected from the group consisting of benzene, naphthalene and alkyl benzene and alkyl naphthalene hydrocarbons.

2. The process of claim 1 further characterized in that said mono-olefinic hydrocarbon contains from 2 to 5 carbon atoms per molecule.

3. The process of claim 1 further characterized in that said mono-olefinic hydrocarbon is ethylene.

4. The process of claim 1 further characterized in that said diluent is a halogen-substituted benzene hydrocarbon.

5. The process of claim 4 further characterized in that said halogen-substituted benzene hydrocarbon is p-chlorotoluene.

6. The process of claim 3 further characterized in that said diluent is p-chlorotoluene.

7. The process of claim 4 further characterized in that said halogen-substituted benzene hydrocarbon is chlorobenzene.

8. The process of claim 1 further characterized in that said diluent is a halogen-substituted naphthalene.

9. The process of claim 8 further characterized in that said halogen-substituted naphthalene comprises dichloronaphthalene.

References Cited in the file of this patent

UNITED STATES PATENTS

| | | |
|---|---|---|
| 2,114,233 | Neher et al. | Apr. 12, 1938 |

FOREIGN PATENTS

| | | |
|---|---|---|
| 874,215 | Germany | Apr. 20, 1953 |
| 533,362 | Belgium | May 16, 1955 |
| 538,782 | Belgium | Dec. 6, 1955 |
| 1,132,506 | France | Nov. 5, 1956 |

OTHER REFERENCES

Raff et al.: Polyethylene, p. 79 (1956), Interscience Publishers, Inc., N.Y.